May 11, 1948. A. KLAMMT ET AL 2,441,323
CONVEYOR AND DISCHARGE MECHANISM FOR PARQUET FLOORING BLOCKS
Filed July 1, 1943 2 Sheets-Sheet 1
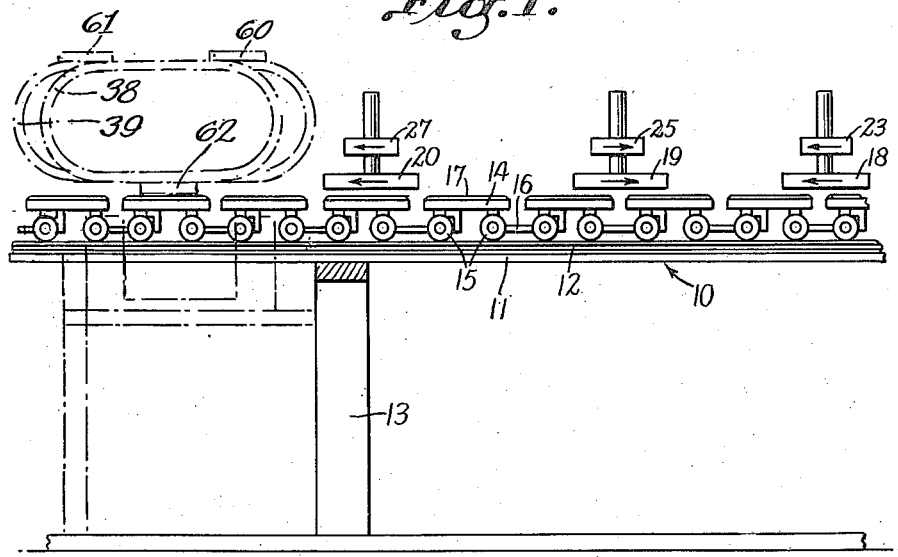
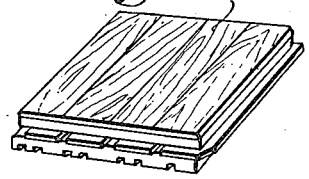
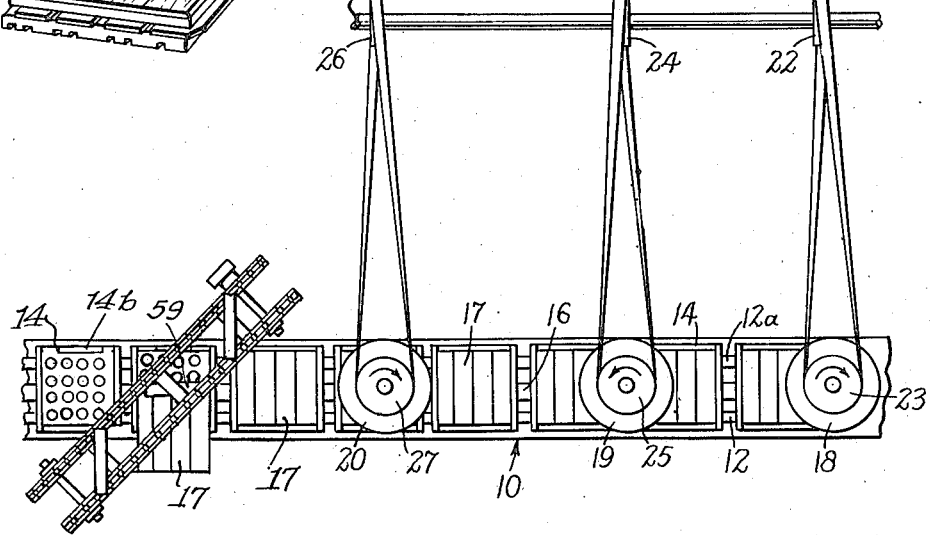
INVENTORS
ARTHUR KLAMMT
GEORGE W. KRETZSCHMAR
BY
Van Deventer + Grier
ATTORNEYS

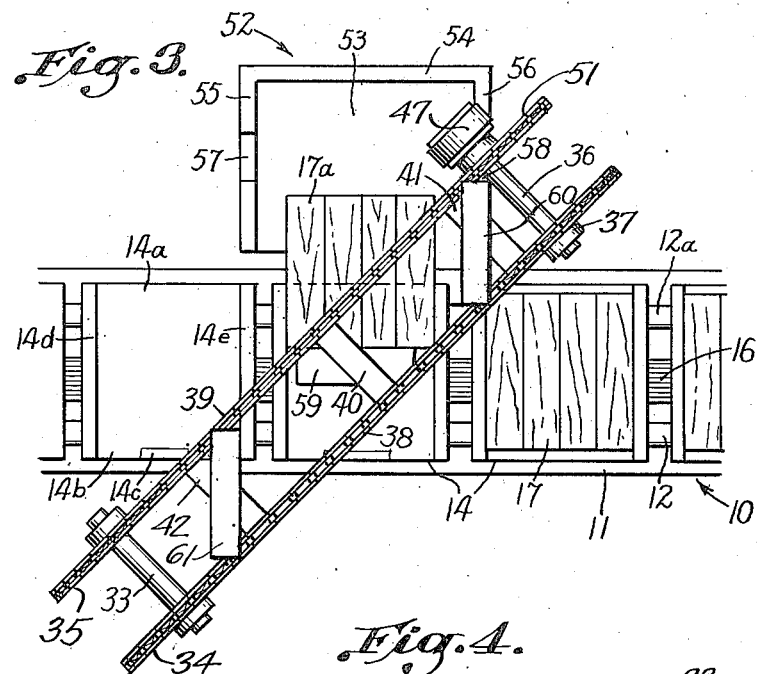
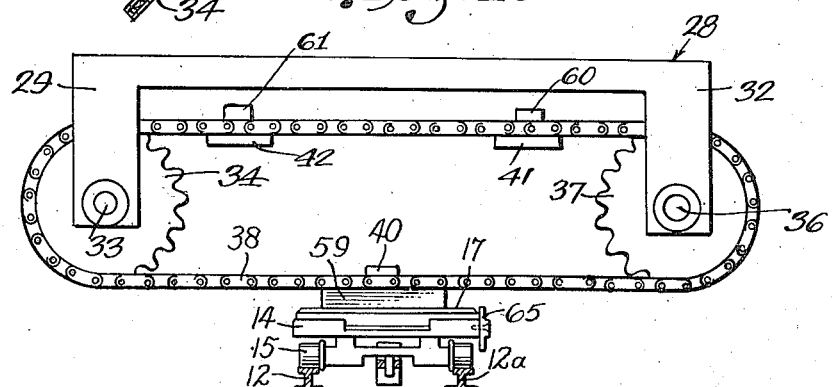
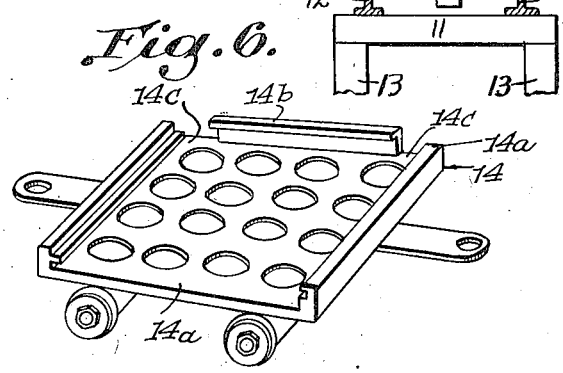

Patented May 11, 1948

2,441,323

UNITED STATES PATENT OFFICE 2,441,323

CONVEYOR AND DISCHARGE MECHANISM FOR PARQUET FLOORING BLOCKS

Arthur Klammt, New York, N. Y., and George W. Kretzschmar, Garfield, N. J., assignors to W. M. Ritter Lumber Company, a corporation of West Virginia Application July 1, 1943, Serial No. 493,122

2 Claims. (Cl. 214—6)

This invention relates to improvements in apparatus for performing finishing operations on flooring or the like, and has for an object the provision in apparatus for finishing parquet flooring blocks or the like, wherein said blocks are moved along the trackway at a predetermined rate, an unloading station adjacent to said trackway, and mechanism carrying a plurality of engaging members moving in a path angular with respect to the path of movement of said flooring blocks, the result of both said movements effecting the ejecting of said blocks into said unloading station.

This application is a continuation-in-part of copending and abandoned application Serial No. 438,112, filed April 8, 1942.

Other objects and advantages of the invention will be apparent to those skilled in the art upon a study of the following specification and the accompanying drawings.

In the drawings:

Figure 1 is an elevation of a trackway carrying a series of parquet flooring blocks on dollies and including mechanism for ejecting said blocks from said dollies into the unloading station adjacent to said trackway. The unloading station per se is not shown in Figure 1 but may be seen in Figure 3, to be presently described;

Figure 2 is a plan view of the mechanism shown in Figure 1, and in this figure, the unloading station per se is not shown;

Figure 3 is an enlarged plan view of a portion of the mechanism shown in Figures 1 and 2, which includes an unloading station and shows details of the unloading mechanism which is adapted to discharge the blocks from the dolly into said unloading station;

Figure 4 is an elevation of the arrangement shown in Figure 3;

Figure 5 is a perspective view of a parquet block, such as is carried on the dollies; and Figure 6 is a perspective view of one of the dollies.

Referring to said drawings, a trackway 10 comprised of a supporting bed 11 has mounted thereon rails 12 and 12a. This trackway is supported on uprights 13 and carries a plurality of dollies 14, each having flanged wheels 15 engaging the rails. The dollies 14 are secured together by links 16, and each dolly has its body portion formed to accommodate a parquet flooring block 17, such as that shown in perspective in Figure 5.

Means (not shown) is provided for moving said dollies along the trackway 10 at a predetermined rate and the parquet blocks 17 on these dollies, as they pass along the trackway, successively encounter rotary tools 18, 19 and 20, which are driven by power means. These rotary tools may be in the form of brushes or any other form, for producing a desired finish on the parquet blocks, and they may be driven in different directions relative to each other by means of rotating shaft 21. For example, the shaft 21 may carry a pulley 22 belted to the pulley 23 on the tool 18, so as to cause the tool to rotate in a clock-wise direction, as viewed from above.

The next tool 19 may be driven by a pulley 24 so belted to pulley 25 on the shaft of the tool 19 as to cause the pulley to rotate in a counter-clockwise direction, as seen from above, which direction is opposite from the direction of rotation of the tool 18.

A third tool 20 may be so belted to the pulley on the shaft 21 that its spindle pulley 27 rotates in a clockwise direction, as seen from above.

From the above, it can be seen that as the dollies carrying the parquet blocks pass beneath these tools, they are polished first in one direction, next, in the oposite direction, and then in the first direction again.

Referring now to Figures 3 and 4, a frame member 28 has depending portions, two of which are shown at 29 and 32, and like portions spaced apart therefrom and in alignment therewith, as seen in Figure 4. These portions are formed integral with said frame and include bearings near their upper ends. Rotatably supported in the bearing portion 29 and the portion in alignment therewith is a shaft 33 which carries sprockets 34 and 35 in spaced relation to each other.

A second shaft 36 is journaled in the portion 32 and the portion in alignment therewith and carries sprockets 51 and 37. All of these sprockets are of the same size and have the same number of teeth.

In Figure 3, the frame member 28 has been omitted for the sake of clarity. However, it will be understood that the shafts 33 and 36 are journaled in this frame member, as above described. A link chain 38 is placed about the sprockets 34 and 37 and likewise a second link chain 39 is placed about the sprockets 35 and 51.

A bridge member 40 positioned between the chain has one end secured to the chain 38 and its other end secured to the chain 39. A second bridge member 41 and a third bridge member 42 are mounted on chains 38 and 39 in the same manner and these bridge members are preferably spaced equi-distant from each other.

Although only three bridge members are described, it is obvious that we may use a greater or less number of bridge members without departing from the spirit of the invention.

Secured to the bridge member 40 is an engaging member 59 the edge of which is adapted to engage the edge of the flooring block 17 in any of the dollies which are positioned below the chain as the bridge member is moving thereover. The engaging member 59 is secured to the bridge member 40 in angular relation, which angular relation is substantially the same as the angular disposal of the mechanism (Figure 3) with respect to the path of travel of the dollies carried by parquet blocks, as will hereinafter be explained.

Similar engaging members 60 and 61 are secured to the bridge members 41 and 42, respectively, and they function in the same manner as does the engaging member 59.

The shaft 36 carries a pulley 47 which may be connected by means of a belt to a pulley on a prime mover (not shown). As the pulley 47 rotates, the sprockets 51 and 37 rotate therewith and drive the chains 38 and 39 and these chains, in turn, drive the sprockets 35 and 34, respectively. This causes the engaging members 59, 60 and 61 to successively and sequentially engage the edges of the parquet flooring blocks 16 and 17 moving successively into the range of said members. The mechanism shown in Figures 3 and 4, as can be seen in Figures 1 and 2, is angularly disposed with respect to the movement of the dollies carrying the parquet flooring blocks along the trackway 10 and this movement is so related to the movement of the engaging members along their angular path that the resultant movement of the blocks 17 is laterally along a substantially straight line.

Referring to Figure 3, an unloading station 52 may consist of a platform 53 suitably supported adjacent to the trackway 10, which is provided with an upright side wall 54 joined by upright end walls 55 and 56. Slots 57 and 58 are formed in the end walls to facilitate the removal of parquet blocks from said unloading station.

As shown in Figure 6, the dollies 14 have their sides 14a open and their sides 14b have slots 14c formed therein. The dollies are each provided with edges 14d and each of these edges is provided with a longitudinal slot on its inner edge. The dollies each have edges 14e which are disposed on the sides opposite the edges 14d and each edge 14e is provided with a longitudinal tongue which extends inwardly. The slot and tongue on each dolly are adapted to be slidably engaged respectively by the tongue and the groove of the parquet blocks 17.

The engaging members 59, 60 and 61 are of such length that they clear the sides 14b of the dollies and engage and push the blocks 17 laterally from the dollies and into the unloading station 52.

In Figure 3, the parquet block 17a is shown as moved a little over half way out of the dolly by the engaging member 59. As the engaging member 59 continues its movement diagonally to the right, as seen in Figure 3, the dolly is moved upwardly, with the result that as the engaging member 59 passes out from the surface of the dolly just clearing the upper right-hand corner thereof (the upper end of the edge 14d) the block 17a is completely ejected from the dolly and falls to the platform 53 of the unloading station. As the next succeeding dolly approaches the unloading station, the parquet block 17 carried thereby likewise is ejected therefrom by the engaging member 61. Then, the next succeeding dolly has its parquet block ejected by the engaging member 60, and this continues to repeat as long as the device is operated.

Although we have herein shown and described by way of an example, apparatus for performing work on the surfaces of parquet flooring blocks and ejecting said blocks onto an unloading station, it is obvious that many changes may be made in the arrangements shown and described within the scope of the following claims.

What is claimed is:

1. Conveyor mechanism for parquet flooring blocks and discharge apparatus therefor comprising, a trackway, a series of dollies moving therealong at a predetermined rate, each dolly being adapted to support a parquet flooring block, whereby the latter may be laterally ejected therefrom into an unloading station adjacent to and below the level of said trackway, said station having boundaries extending vertically on three sides, the other side being open toward said trackway, the two boundaries adjacent to said open side having vertical slots formed therein to facilitate the removal of stacks of said blocks from said unloading station and a series of engaging members moving along a path forming an acute angle with the path of movement of said dollies and adapted to push, eject and stack parquet blocks into said unloading station via said open side.

2. Conveyor mechanism for parquet flooring blocks and discharge apparatus therefor, comprising a trackway, a series of dollies connected together and moved therealong at a predetermined rate; each of said dollies having an open side, a closed side adjacent thereto and carrying a slot, a second side adjacent thereto and carrying a tongue, and a side opposite said open side; said slot being adapted to be engaged by a tongue on a parquet flooring block and said tongue being adapted to be engaged by a groove in a parquet flooring block, whereby such blocks may be slidably removed from the dolly via said open side, an unloading station adjacent to and having an opening facing said trackway, and a series of engaging members moving along a path angularly disposed in an angle of less than 90° with respect to the path of movement of said dollies, said members being adapted to push and eject said blocks from said dolly and into said unloading station via said open side as each dolly is traversing said open side.

ARTHUR KLAMMT.
GEORGE W. KRETZSCHMAR.

REFERENCES CITED

The following references are of record in the file of this patent:

UNITED STATES PATENTS

| Number | Name | Date |
| --- | --- | --- |
| 559,166 | Derby | Apr. 28, 1896 |
| 1,365,583 | Brown | Jan. 11, 1921 |
| 1,591,309 | Hatch, Jr. | July 6, 1926 |
| 1,803,434 | Merian | May 5, 1931 |
| 1,935,660 | Norton | Nov. 21, 1933 |
| 2,069,900 | Perazzoli | Feb. 9, 1937 |
| 2,137,535 | MacLean | Nov. 22, 1938 |
| 2,152,801 | Harrington | Apr. 4, 1939 |
| 2,182,005 | Stetson | Dec. 5, 1939 |
| 2,187,131 | Lippold | Jan. 16, 1940 |
| 2,264,818 | Wilcox et al. | Dec. 2, 1941 |

FOREIGN PATENTS

| Number | Country | Date |
| --- | --- | --- |
| 39,987 | Austria | Dec. 10, 1909 |